(12) United States Patent
Katsumura

(10) Patent No.: US 7,554,896 B2
(45) Date of Patent: Jun. 30, 2009

(54) ELECTRON BEAM RECORDING APPARATUS

(75) Inventor: Masahiro Katsumura, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 35 days.

(21) Appl. No.: 10/594,056

(22) PCT Filed: Mar. 22, 2005

(86) PCT No.: PCT/JP2005/005650

§ 371 (c)(1),
(2), (4) Date: Jun. 20, 2007

(87) PCT Pub. No.: WO2005/093722

PCT Pub. Date: Oct. 6, 2005

(65) Prior Publication Data

US 2007/0286036 A1 Dec. 13, 2007

(30) Foreign Application Priority Data

Mar. 26, 2004 (JP) ............................... 2004-091203

(51) Int. Cl.
G11B 7/00 (2006.01)
(52) U.S. Cl. .................................. 369/124.02; 369/121
(58) Field of Classification Search ........................ None
See application file for complete search history.

(56) References Cited

U.S. PATENT DOCUMENTS

2004/0057158 A1 3/2004 Usa et al.

FOREIGN PATENT DOCUMENTS

| JP | 07-65363 | 3/1995 |
|---|---|---|
| JP | 08-180350 | 7/1996 |
| JP | 09-204654 | 8/1997 |
| JP | 11-224422 | 8/1999 |
| JP | 11-288532 | 10/1999 |
| JP | 2000-207738 | 7/2000 |
| JP | 2001-067736 | 3/2001 |
| JP | 2002-324312 | 8/2002 |
| JP | 2004-158287 | 6/2004 |

*Primary Examiner*—Paul Huber
(74) *Attorney, Agent, or Firm*—Drinker Biddle & Reath LLP

(57) ABSTRACT

An electron beam recording apparatus provided with control means for forming a latent image in a resist layer on a disk substrate corresponding to a predetermined pattern by controlling the irradiation position of an electron beam irradiation unit on the surface of the resist layer in accordance with the rotation angle of the disk substrate by a rotational drive unit, the shift position by a shift drive unit and the recording data that represent the predetermined pattern, and beam-adjusting means for irradiating an electron beam so as to spread over a plurality of tracks in the direction of traversing the tracks in response to the irradiation position control due to the control means, and an electron beam recording method using the apparatus.

12 Claims, 15 Drawing Sheets

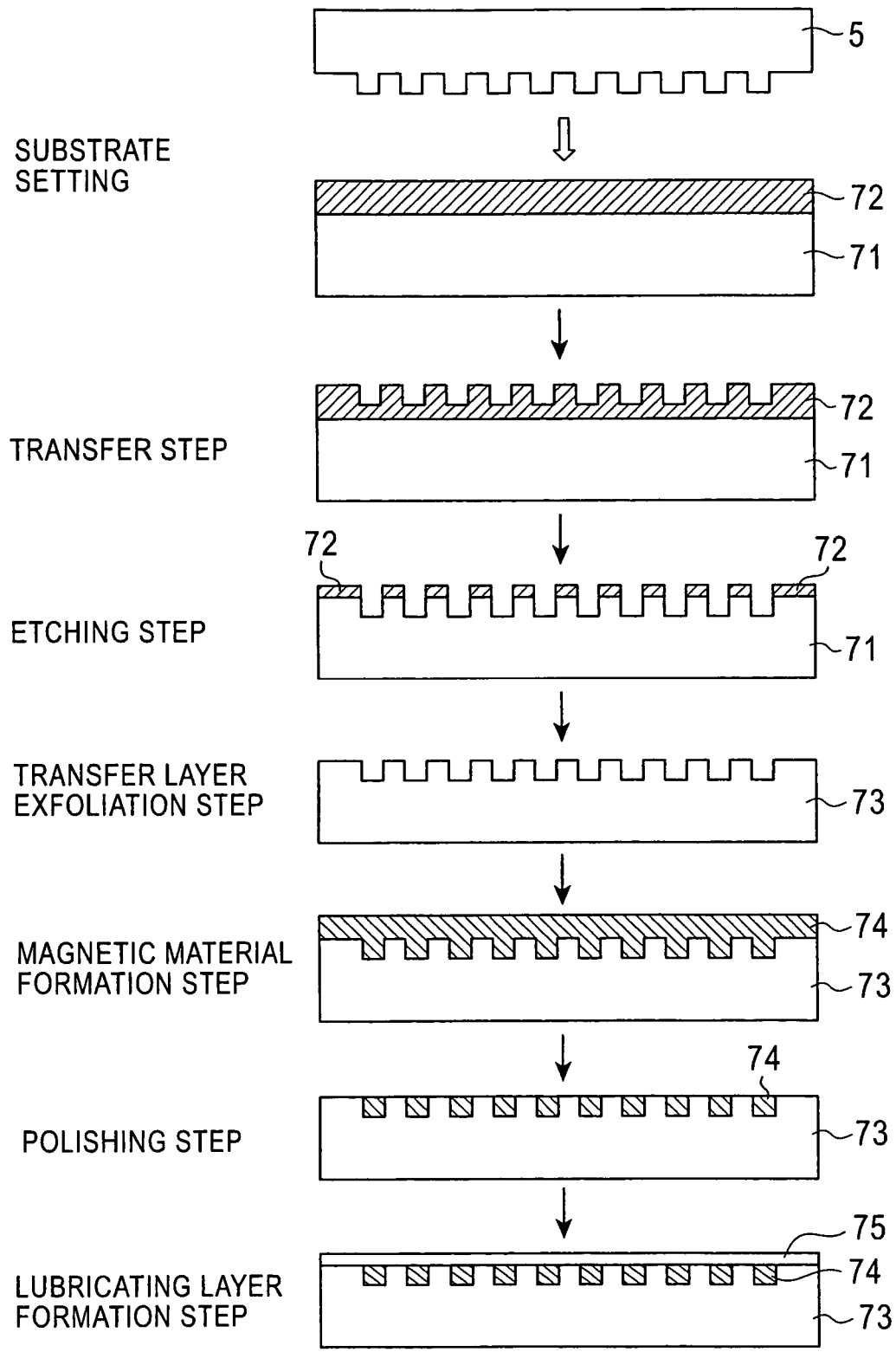

ELECTRON BEAM RECORDING APPARATUS

This application is a 371 of PCT/JP05/05650, filed Mar. 22, 2005.

1. Technical Field

This present invention relates to an electron beam recording apparatus which records patterns such as a servo pattern onto a disk substrate by exposure.

2. Background Art

In a hard disk drive (HDD), position information to detect the position of a magnetic head relative to a track of a magnetic disk is recorded in the magnetic disk as a servo pattern. In a magnetic disk, as shown in FIG. 1, a servo zone, in which servo patterns are recorded, and a data zone, in which data is recorded/reproduced, are arranged alternately at constant angular intervals along the track in the circumferential direction. The magnetic head can detect the recording or reproduction position at constant time intervals during data recording or reproduction.

However, in the conventional manufacture of a hard disk drive, it has been a common practice to record the servo pattern on each magnetic disk by means of a device called servo track writer, and thereafter to assemble the recorded disk into the hard disk drive. There has been a problem of low production efficiency for hard disk drives, since it takes approximately 10 min for the recording of the servo pattern in a 20 GB (gigabyte)/disk-class magnetic disk.

To cope with this problem, a method is known in which a master disk on which a magnetic film pattern corresponding to a servo pattern has been formed by lithography is magnetically transferred collectively in the whole area onto a magnetic disk (Fuji Electric Review, Vol. 75, No. 3, published on Mar. 10, 2002). By adopting this method, the time required for recording a servo pattern on a magnetic disk can be reduced. In the recording method for magnetic disks based on the magnetic transfer, there has been another problem that the process of recording on each magnetic disk becomes complicated.

Thus, highly precise formation of a servo pattern at the step of disk substrate recording is desired in order to enhance the production efficiency for hard disk drives. However, there is a problem that the conventional electron beam recording apparatus cannot be applied as it is, since the servo pattern of the magnetic disk for hard disk drives includes longitudinal patterns covering a plurality of tracks in the disk radial direction.

DISCLOSURE OF INVENTION

An object of the present invention is to provide an electron beam recording apparatus and an electron beam recording method which is capable of recording a servo pattern for magnetic disks on a disk substrate with high accuracy.

According to the invention, there is provided an electron beam recording apparatus comprising: a rotational drive unit for rotationally driving a disk substrate having a surface on which a resist layer is formed; an electron beam irradiation unit for irradiating an electron beam for exposure onto the surface of the resist layer in a freely deflectable manner; a shift drive unit for shifting the irradiation position of the electron beam by a predetermined distance in the radial direction of the disk substrate for each one rotation by the rotational drive unit to advance the irradiation position of the electron beam; and control means for forming a latent image corresponding to a predetermined pattern, in the resist layer by controlling the irradiation position caused by the electron beam irradiation unit on the surface of the resist layer in accordance with the rotation angle of the disk substrate caused by the rotational drive unit, the shift position caused by the shift drive unit and recording data that represents the predetermined pattern; wherein the electron beam irradiation unit includes beam-adjusting means for adjusting the irradiation of the electron beam in such a manner as to spread over a plurality of tracks in the direction of traversing the tracks on the surface of the resist layer in response to the irradiation position control by the control means.

According to the invention, there is provided an electron beam recording method comprising steps of: a rotational drive step for rotationally drives a disk substrate having a surface on which a resist layer is formed; an irradiation step for irradiating an electron beam for exposure onto the surface of the resist layer in a freely deflectable manner; a shift drive step for shifting the irradiation position of the electron beam by a predetermined distance in the radial direction of the disk substrate for each one rotation of the disk substrate to advance the irradiation position of the electron beam; and a control step for forming a latent image corresponding to a predetermined pattern, in the resist layer by controlling the irradiation position of the electron beam on the surface of the resist layer in accordance with the rotation angle of the disk substrate, the shift distance of the irradiation position of the electron beam in the radial direction of the disk substrate and recording data that represents the predetermined pattern; wherein the irradiation step irradiates the electron beam in such a manner as to spread over a plurality of tracks in the direction of traversing the tracks on the surface of the resist layer in response to the irradiation position control in the control step.

BRIEF DESCRIPTION OF DRAWINGS

FIG. 16 is a diagram showing a process of manufacturing a substrate.

DETAILED DESCRIPTION OF THE INVENTION

In the following, embodiments of the present invention are described in detail with reference to the drawings.

Figure 1:
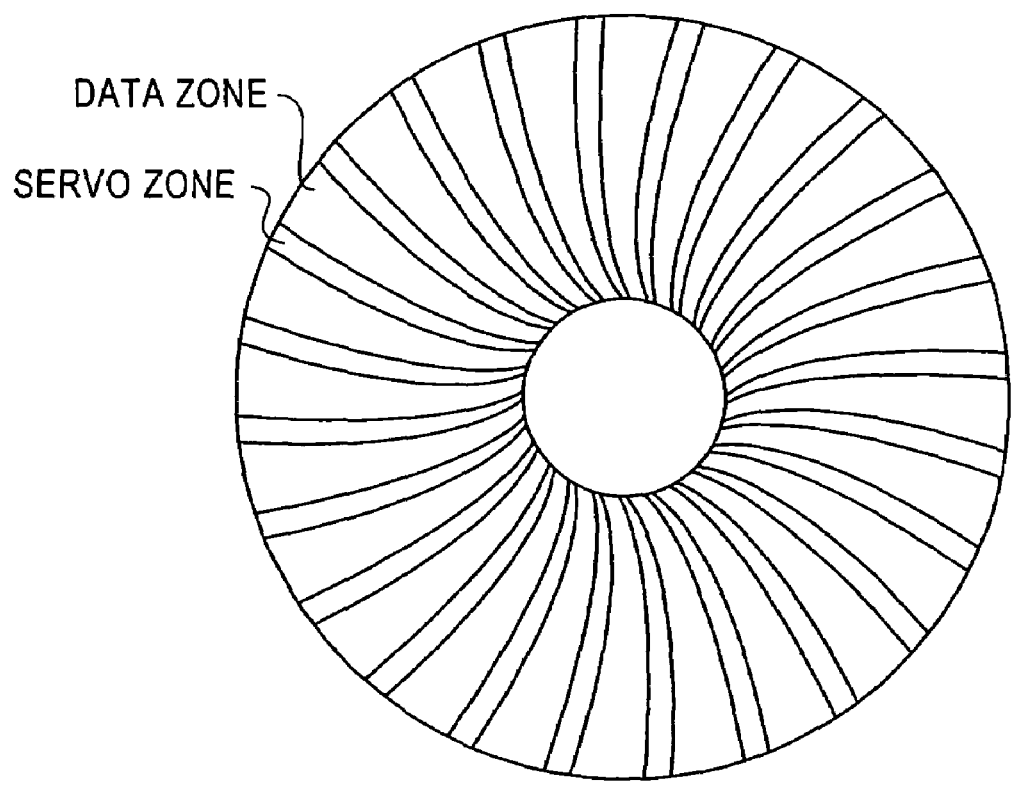
FIG. 1 is a diagram showing a magnetic disk of a structure repeatedly having a servo zone and a data zone.
Figure 2:
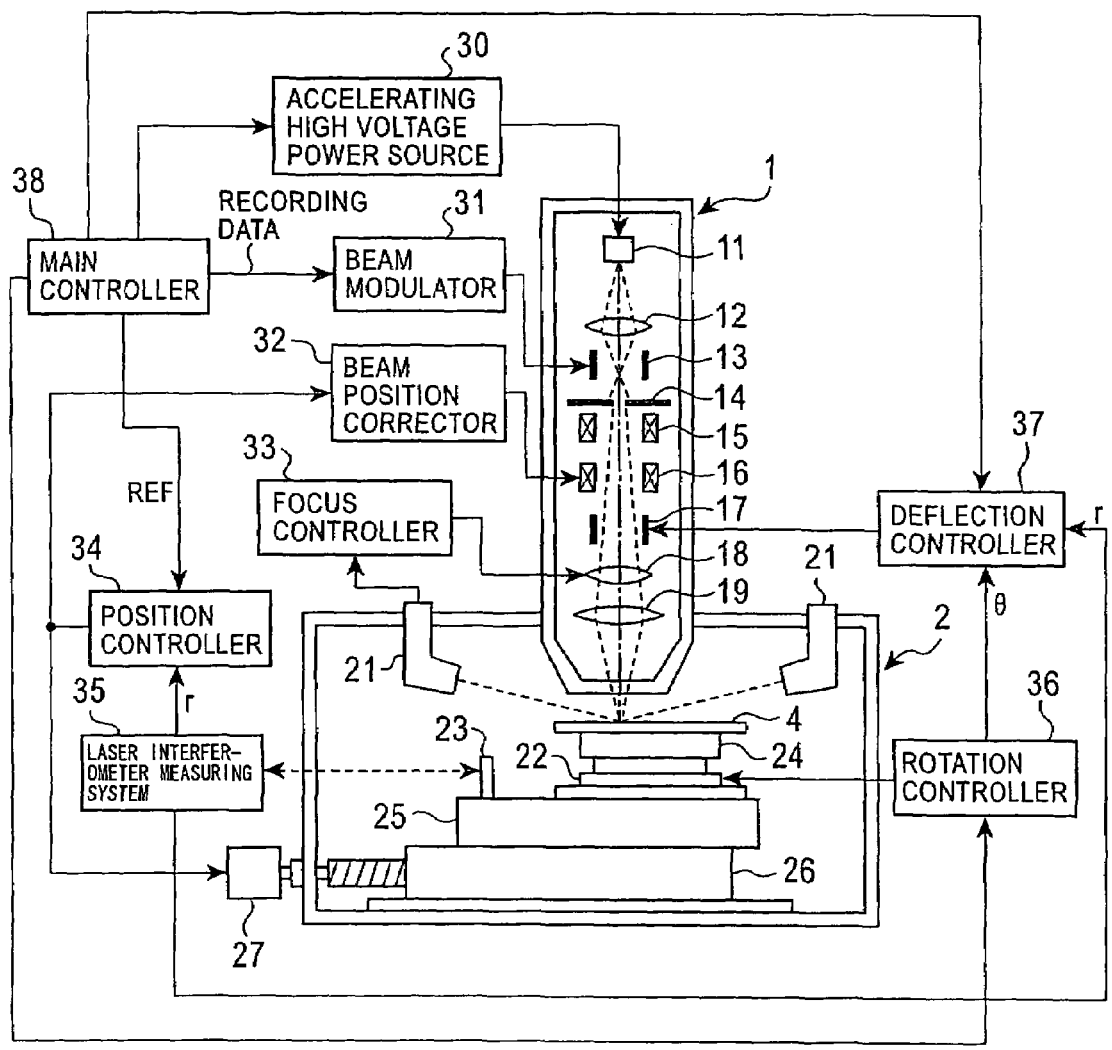
FIG. 2 is a diagram showing an electron beam recording apparatus according to the present invention.

FIG. 2 shows an electron beam recording apparatus according to the present invention. This recording apparatus has an electron column 1, a vacuum chamber 2 and a recording control system. In FIG. 2, the inner structures of the electron column 1 and the vacuum chamber 2 are shown.

The electron column 1 is a cylindrical member having therein an optical system which generates an electron beam and irradiates the beam onto a disk substrate 4 to be described later and placed in the vacuum chamber 2. The optical system in the electron column 1 is provided with an electron emitter 11, a condenser lens 12, a blanking plate 13, an aperture plate 14, a deflection coil 15, an alignment coil 16, a high-speed deflector 17, a focus lens 18 and an object lens 19. These members 11 to 19 are arranged in the electron column 1 from the top in the described order.

The electron emitter 11 generates an electron beam when a high voltage is applied by means of an accelerating high voltage power source 30 to be described later. The condenser lens 12 condenses or converges the electron beam generated by the electron emitter 11 to form a crossover at the central area of the blanking plate 13. The blanking plate 13 is, for example, an electrostatic deflector-type electrode to turn on or off the electron beam in response to the output signal of a beam modulator 31 to be described later. The aperture plate 14 is provided with a circular aperture to restrict the electron beam flux. The deflection coil 15 changes the advancing direction of the electron beam in response to the output signal of a deflection circuit not shown in the drawing. The alignment coil 16 deflects the electron beam in response to the output signal of a beam position corrector 32 to make the beam agree with the optical axis. The high-speed deflector 17 deflects the electron beam in an arbitrary direction in response to the output signal of a deflection controller 37. The focus lens 18 makes the electron beam light in focus on the disk substrate 4 via the object lens 19 in response to the output signal of a focus controller 33.

In the vacuum chamber 2, a height detector 21, a spindle motor 22, a mirror 23, a turntable 24, a stage 25 and a stage-moving mechanism 26 are provided. The spindle motor 22 and the mirror 23 are arranged on the stage 25. The spindle motor 22 rotates the turntable 24. The disk substrate 4 is mounted and fixed on the turntable 24. The disk substrate 4 is, for example, a silicon substrate on which an electron beam resist layer is formed. The stage 25 is configured so as to be movable in the radial direction of the disk substrate 4 (X-direction) by means of the stage-moving mechanism 26. The stage-moving mechanism 26 moves the stage 25 by using a motor 27 attached to the outside of the vacuum chamber 2 as a driving power source. The mirror 23 is installed to measure the moving distance of the stage 25 in the disk radial direction. The height detector 21 is arranged at the upper part in the vacuum chamber 2, and optically detects the height of a recording position on the disk substrate 4.

The recording control system is provided with the accelerating high voltage power source 30, the beam modulator 31, the beam position corrector 32, the focus controller 33, a position controller 34, a laser interferometer measuring system 35, a rotation controller 36, the deflection controller 37 and a main controller 38.

The accelerating high voltage power source 30 applies high voltage to the electron emitter 11 in response to an instruction of the main controller 38.

The beam modulator 31 supplies beam modulation signal to the blanking plate 13 in response to the recording data fed by the main controller 38.

The focus controller 33 moves the focus position of the focus lens 18 in response to the height information of the recording position detected by the height detector 21.

The laser interferometer measuring system 35 detects the position of the mirror 23, i.e., shifting distance information r of the stage 25 by receiving the reflected light of a laser beam irradiated onto the mirror 23. The shifting distance information r represents the recording position in the radial direction of the disk substrate 4. The shifting distance information r measured with the laser interferometer measuring system 35 is fed to the position controller 34. The position controller 34 compares the shifting distance information r with reference distance information REF and drives the motor 27 via motor driving means not shown in the diagram in response to the positional error signal resulting from the comparison. Further, this positional error signal is fed to the beam position corrector 32. The beam position corrector 32 excites the alignment coil 16 in response to the positional error signal from the position controller 34 to deflect the electron beam.

The rotation controller 36 rotationally drives the spindle motor 22 in response to an instruction of the main controller 38. The deflection controller 37 regulates the deflection of the electron beam by means of the high-speed deflector 17 in response to the recording data fed by the main controller 38, rotation angle information θ for the spindle motor 22 obtained by the rotation controller 36 and the shift distance information r measured by the laser interferometer measuring system 35. The rotation angle information θ represents the angle of the recording position on the disk substrate 4.

The accelerating high voltage power source 30, the beam modulator 31, the focus controller 33, the position controller 34, the rotation controller 36 and the deflection controller 37 are controlled in response to each instruction of the main controller 38, respectively.

Next, pattern recording on the disk substrate 4 with use of the electron beam recording apparatus of such configuration will be described.

In the recording of servo zone data and data zone data, the main controller 38 instructs to the position controller 34 to shift the stage by a predetermined track pitch as the aforementioned reference distance information REF, and instructs to the rotation controller 36 so that the spindle motor 22 rotates at a constant rotary linear velocity.

The position controller 34 compares the shifting distance information r for the stage 25 outputted from the laser interferometer measuring system 35 with the reference distance information REF, and drives the motor 27 via motor driving means not shown in the diagram in response to the positional error signal resulting from the comparison.

By virtue of these instructions and operations, the stage 25 is shifted by means of the stage shifting mechanism 26 by the track pitch in the radial direction of the disk substrate for each one rotation of the disk substrate 4 by means of the spindle motor 22.

Moreover, the main controller 38 instructs to the accelerating high voltage power source 30 to apply high voltage to the electron emitter 11, so that an electron beam is ejected from the electron emitter 11, and further instructs to the focus controller 33 to focus the electron beam on the disk substrate 4.

In response to the positional error signal from the position controller 34, the beam position corrector 32 excites the alignment coil 16 to deflect the electron beam.

From the main controller 38, recording data is fed to the beam modulator 31 in constant clock timing. This clock timing is in synchronism with the instructions to the position controller 34 and the rotation controller 36. The recording data is data representing servo zone data as well as data zone data for one disk arranged in the order of recording. The beam modulator 31 generates a modulation signal in accordance with the recording data, and the blanking plate 13 deflects the electron beam ejected from the electron emitter 11 with the modulation signal. By such modulation, there occur two cases where the electron beam passes through the aperture in the aperture plate 14, or does not. In the case of aperture passing, the passing electron beam is irradiated onto the recording plane of the disk substrate 4 in the form of spot through the deflection coil 15, the alignment coil 16, the high-speed deflector 17, the focus lens 18 and the object lens 19. By electron beam irradiation on the disk substrate 4, the resist layer at the irradiated area is removed. The area where the resist layer has been removed forms a recessed portion, thus giving a pattern. On the other hand, in the case of no aperture passing, the electron beam cannot advance anymore after the aperture plate 14, so that the beam is not irradiated onto the disk substrate 4.

Figure 3:
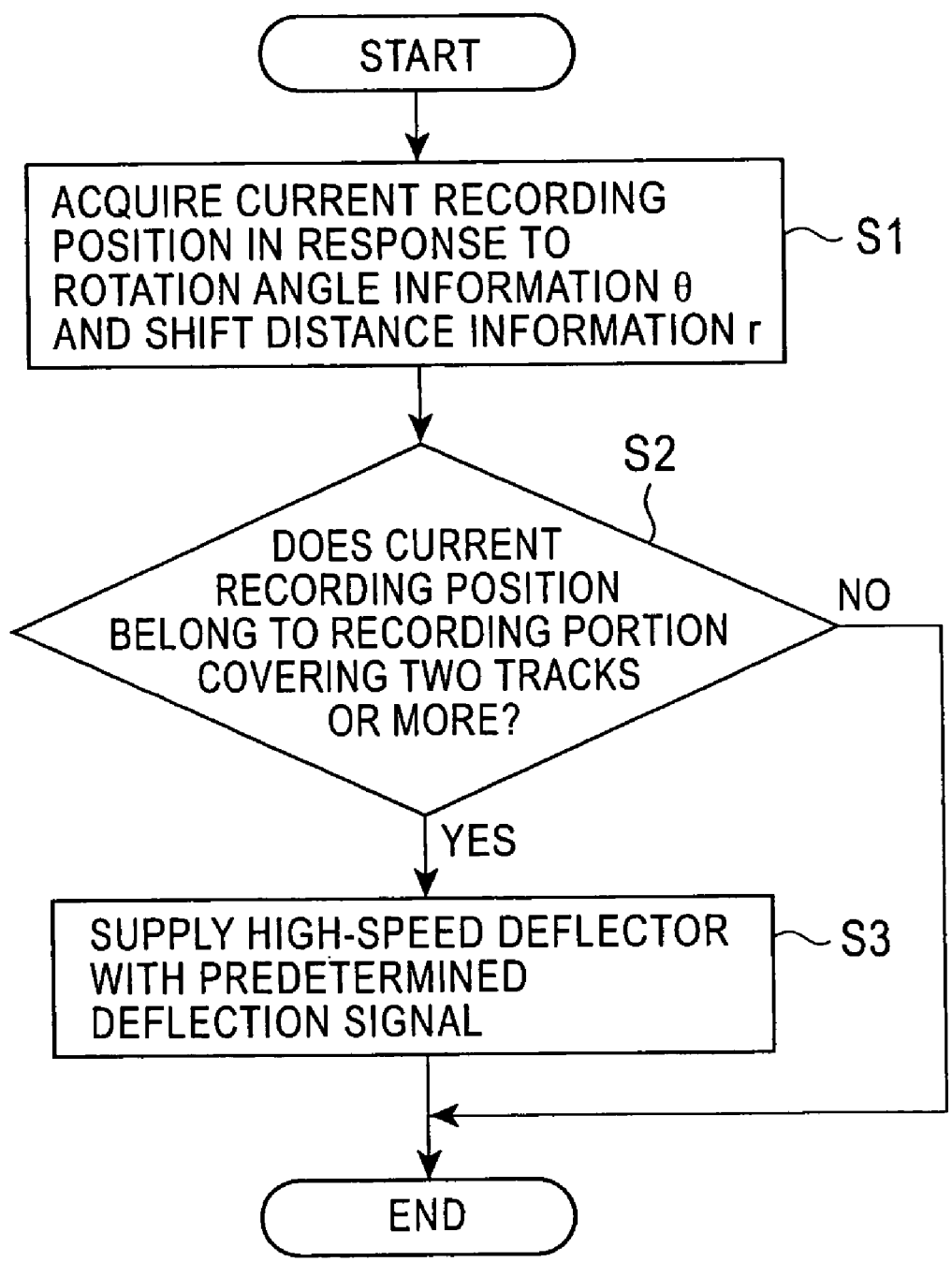
FIG. 3 is a flowchart showing the operation of a deflection controller.

The main controller 38 supplies the aforementioned recording data to the deflection controller 37. As shown in FIG. 3, when the deflection controller 37 acquires the current recording position in response to the rotation angle information θ obtained by the rotation controller 36 and the shift distance information r from the laser interferometer measuring system 35 (step S1), and detects from the recording data that the current recording position constitutes a recording portion covering two tracks or more in the disk radial direction (step S2), it supplies a predetermined deflection signal to the high-speed deflector 17 (step S3). The high-speed deflector 17, when supplied with the predetermined deflection signal, deflects the electron beam by a two-track distance in the disk radial direction.

Figure 4:
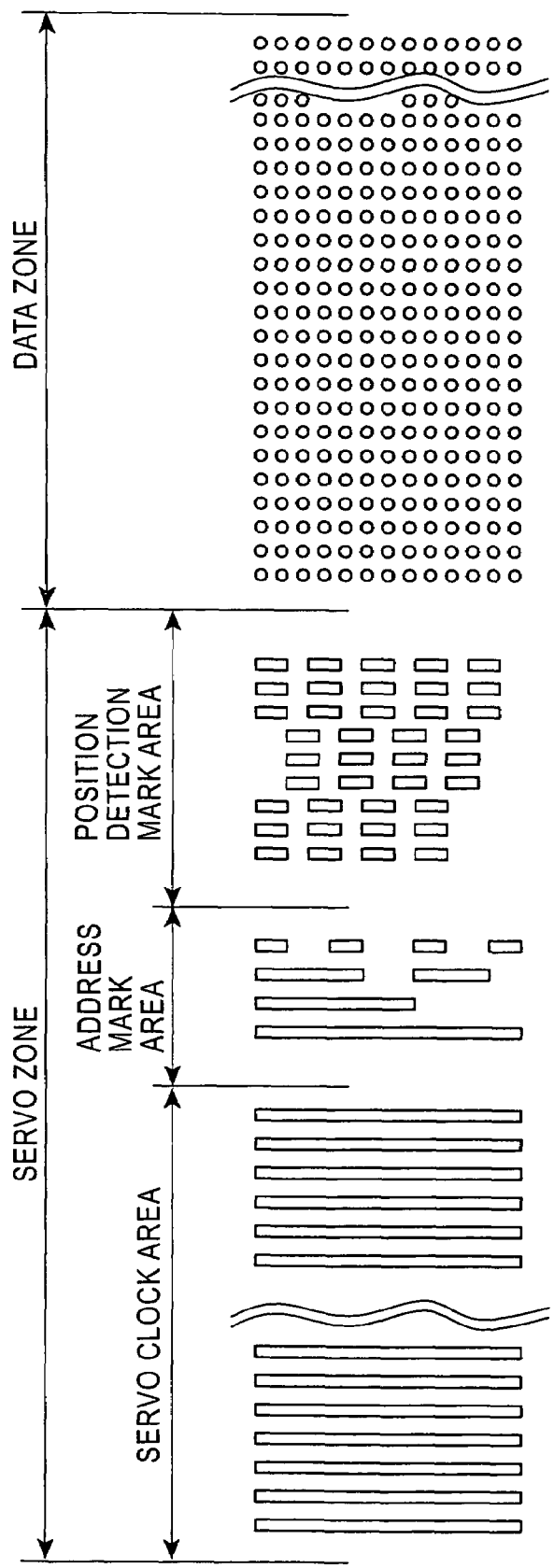
FIG. 4 is a diagram showing the pattern for each servo zone and data zone.

As a result, in the disk substrate 4, patterns consisting of the servo zone and data zone as shown in FIG. 4 are formed. In addition, in the servo zone, a servo clock area for generating clock signal, an address mark area for indicating the address information on tracks, and a position detection mark part for detecting the position on tracks are also formed as patterns. All of those servo clock, address mark and position detection mark areas need not always be formed in the servo zone, but a mark portion containing at least one of clock signal, address signal and position detection signal may be formed.

In the servo clock portion, a longitudinal mark extending so as to spread over all the tracks in the disk radial direction (the direction traversing the tracks) is formed for each predetermined unit angle Δθ. In the address mark area, the mark showing its address information is formed in the disk radial direction lengthwise. The mark length along the disk radial direction widely varies in the address mark area. In position detection mark area, a plurality of marks each having a length spreading over two tracks in the disk radial direction form a hound's-tooth-pattern. In the address mark area and the position detection mark area, the minimum mark-forming interval in the track direction is of a predetermined unit angle Δθ. The data zone is made in the form of patterned media. Namely, for each track, circular marks are formed in the track direction at predetermined unit angular intervals of Δθ. In a disk having the form of patterned media, a single circular mark is recorded as one bit during recording.

Figure 5:
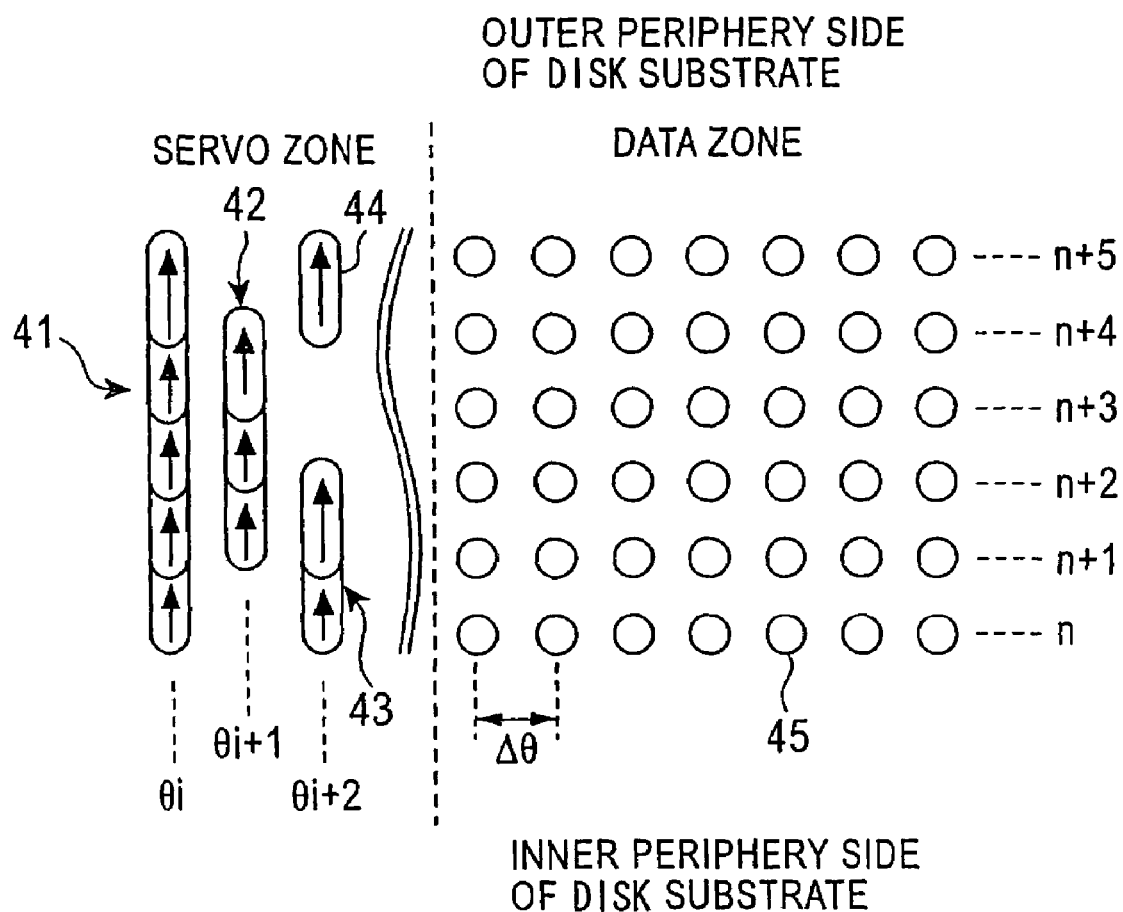
FIG. 5 is a diagram showing the method of forming the patterns for the servo zone and data zone shown in FIG. 4.

The longitudinal mark in the servo zone is formed sequentially from the inner periphery side of the disk substrate 4, as shown in FIG. 5. In FIG. 5, six tracks n to n+5 are shown, in which a longitudinal mark 41 with a length spreading over the six tracks is formed by irradiating an electron beam under high-speed deflection by the two-track distance in the disk radial direction by means of the high-speed deflector 17 at the position of the same rotation angle θi for each of the five tracks n to n+4 so that the two-track deflected portions are continually connected at the overlapping region. Namely, in each of the tracks n+1 to n+4, a two-track deflection ending region overlaps the next two track-deflection starting region. A longitudinal mark 42 with a length spreading over four tracks is formed by irradiating an electron beam under high-speed deflection by the two-track distance in the disk radial direction by means of the high-speed deflector 17 at the position of the same rotation angle θi+1 for each of the three tracks n+1 to n+3 so that the two-track deflected portions are continually connected at the overlapping region. A longitudinal mark 43 with a length spreading over three tracks is formed by irradiating an electron beam under high-speed deflection by the two-track distance in the disk radial direction by means of the high-speed deflector 17 at the position of the same rotation angle θi+2 for each of the two tracks n and n+1 so that the two-track deflected portions are continually connected at the overlapping region. A longitudinal mark 44 with a length spreading over two tracks is formed by irradiating an electron beam under high-speed deflection by the two-track distance in the disk radial direction by means of the high-speed deflector 17 at the position of the rotation angle θi+2 for the track n+4. In FIG. 5, the direction shown by the arrow in a mark is the direction of a single deflection for the electron beam caused by the high-speed deflector 17.

Each circular mark 45 in the data zone is formed by irradiating an electron beam, without deflection by the high-speed deflector 17, in the track order of the tracks n to n+5 with a predetermined unit angle interval Δθ, as shown in FIG. 5.

Figure 6:
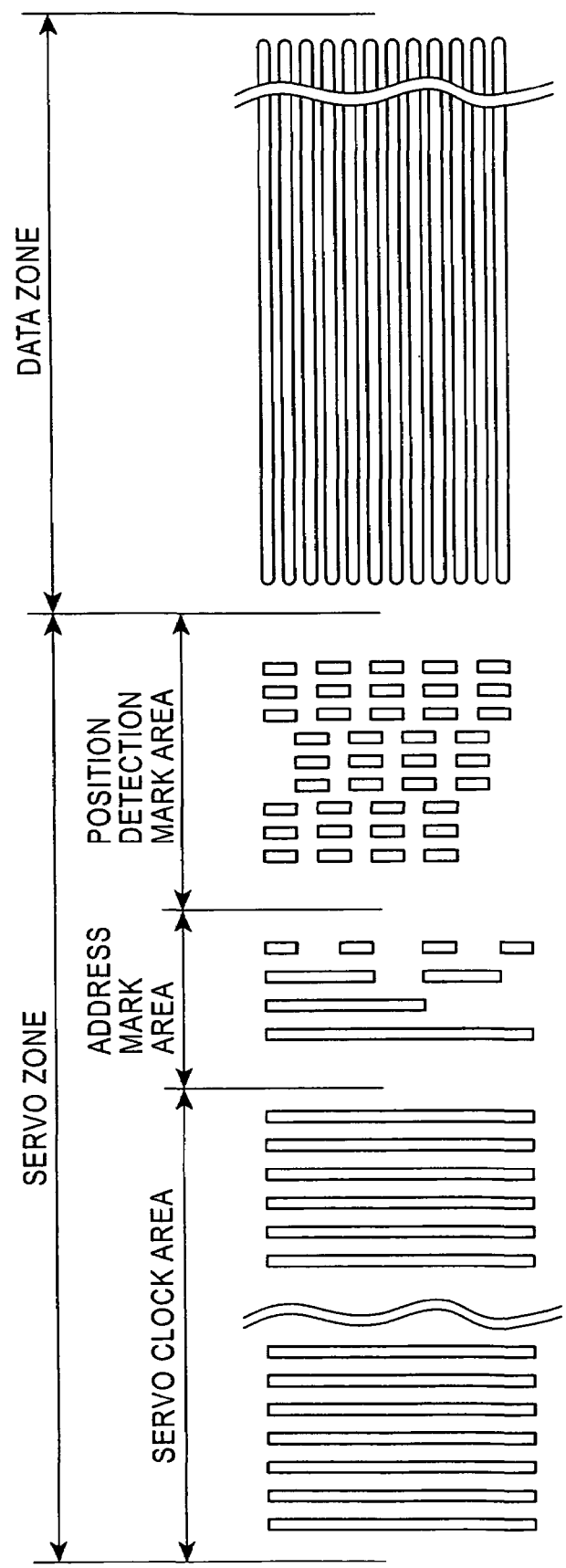
FIG. 6 is a diagram showing different patterns for the servo zone and data zone.
Figure 7:
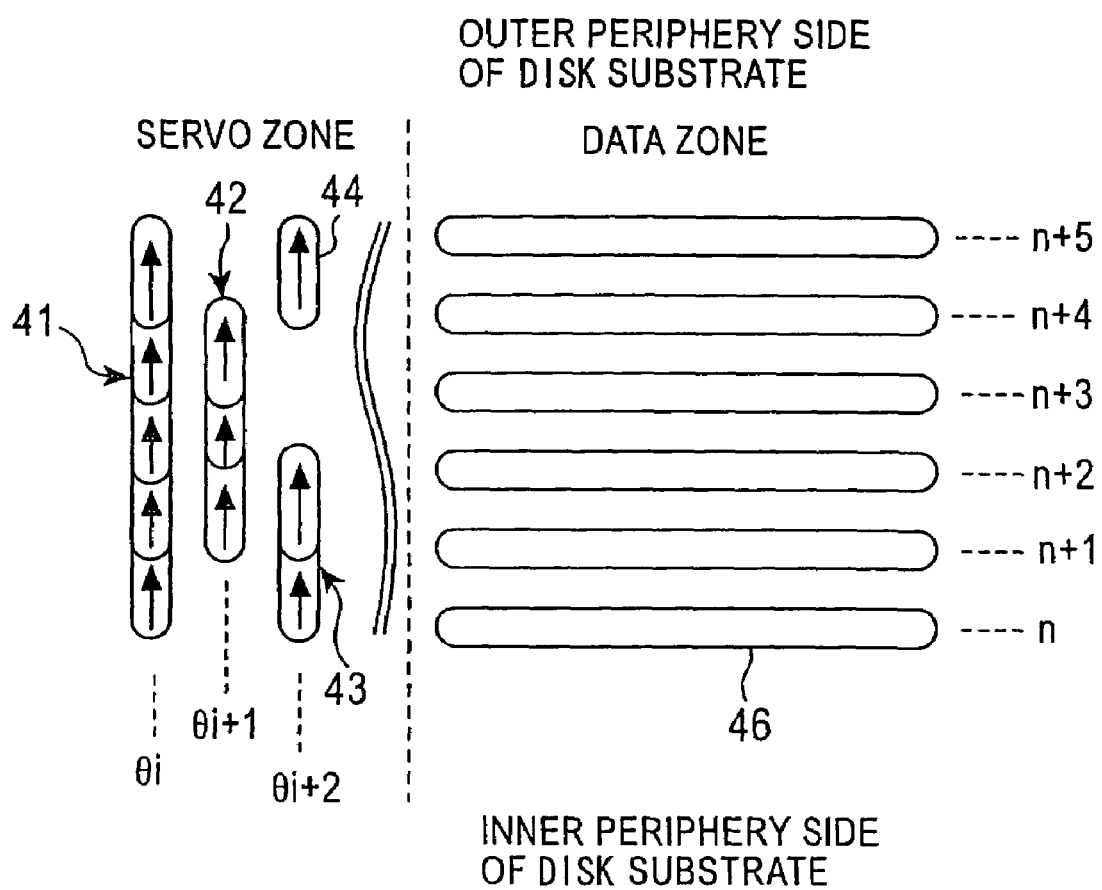
FIG. 7 is a diagram showing the method of forming the patterns for the servo zone and data zone shown in FIG. 6.

FIG. 6 illustrates another example of pattern formation on the disk substrate 4 with use of such an electron beam recording apparatus. Though the patterns in the servo zone of FIG. 6 are the same as those in the servo zone of FIG. 4, the patterns in the data zone are of group recording type in which a mark continuing in the track direction is formed in each track. FIG. 7 shows the method of forming each mark in the servo zone and data zone shown in FIG. 6 wherein the servo zone is common to that of FIG. 5. Each continuous mark 46 in the data zone is formed by continuously irradiating an electron beam, without any deflection by means of the high-speed deflector 17, on tracks n to n+5 in the track order.

According to the foregoing embodiment, the patterns in the data zone and those in the servo zone can be formed in a single process, thus achieving a high accuracy of the recording position of each pattern.

In the case where the recording data corresponding to the rotation angle information θ and the shift distance information r at a current timing is supplied to the deflection controller 37 from the main controller 38, direct supply of the rotation angle information θ and the shift distance information r to the deflection controller 37 is not necessary. Namely, it is enough for the deflection controller 37 to feed the deflection signal to the high-speed deflector 17 only in response to the recording data.

Figure 8:
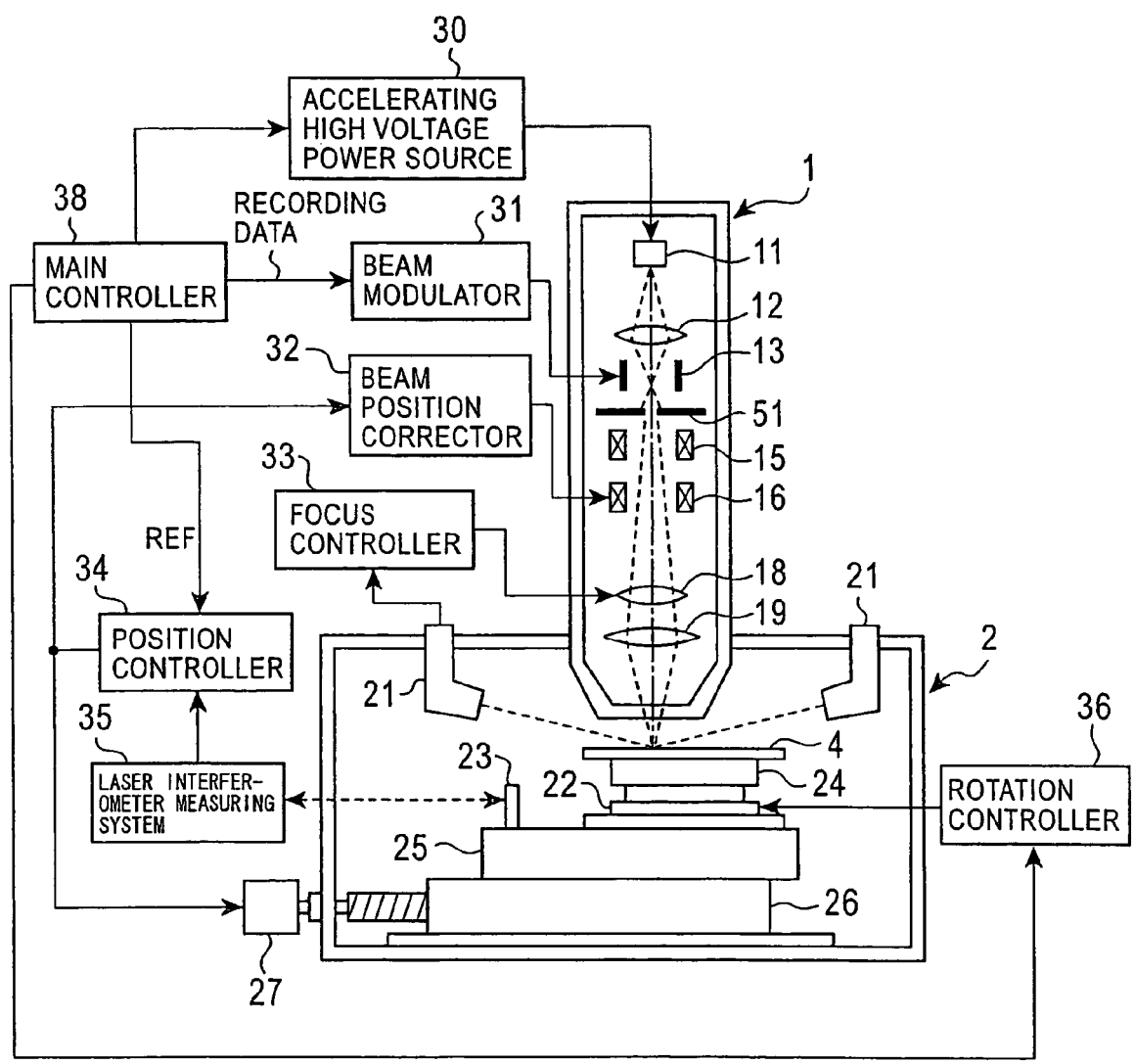
FIG. 8 is a diagram showing an electron beam recording apparatus according to the present invention.
Figure 9:
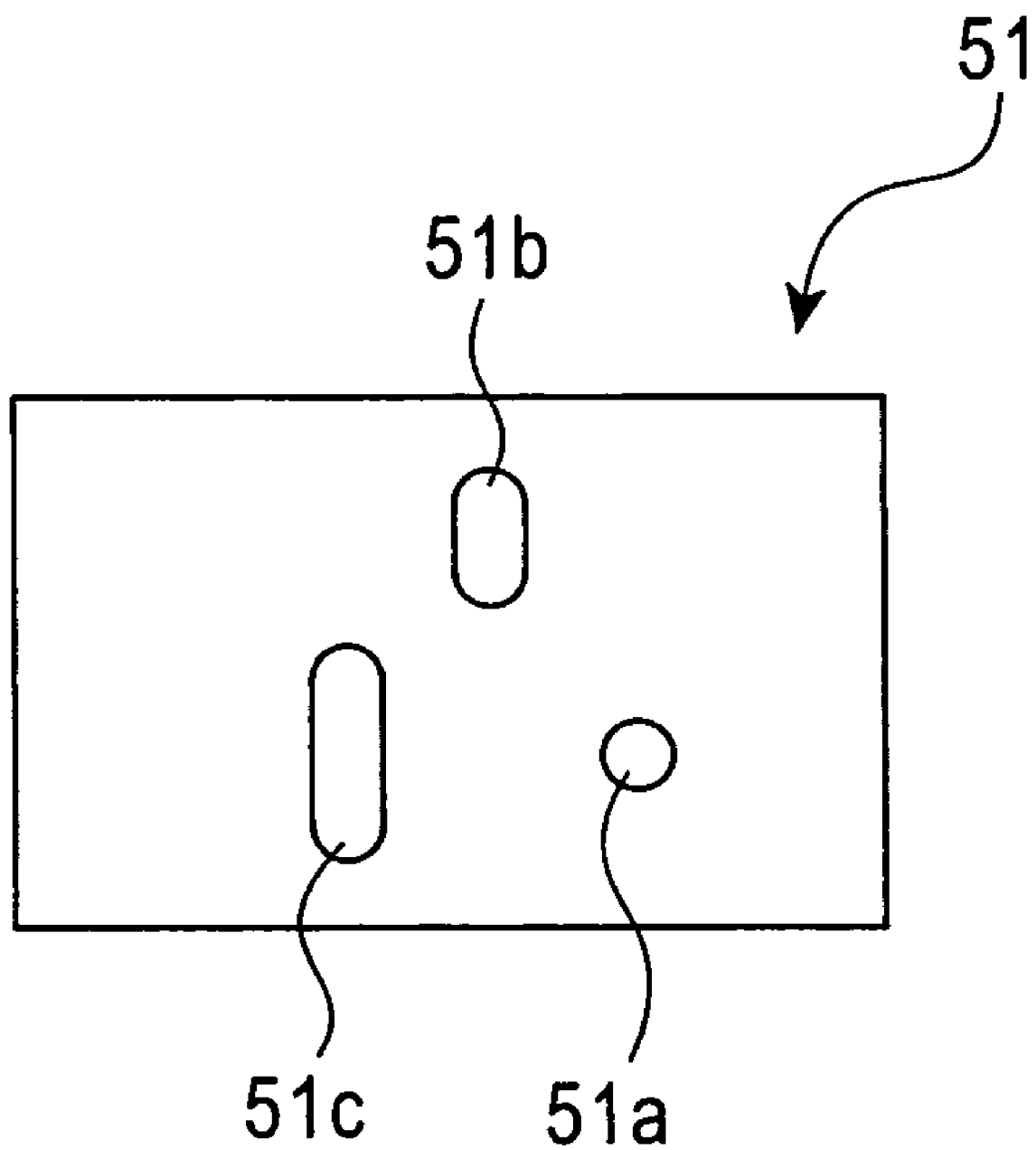
FIG. 9 is a diagram showing the shape of each aperture in the aperture plate used in the apparatus shown in FIG. 8.

FIG. 8 shows another example of the present invention. In the electron beam recording apparatus of FIG. 8, the same parts as those shown in FIG. 2 are given the same signs. Between the blanking plate 13 and the deflection coil 15 installed in the electron column 1, an aperture plate 51 is arranged. The aperture plate 51 is provided with a plurality of apertures that restrict the luminous flux of an electron beam. The aperture plate 51 has, as the above apertures, a circular aperture 51a for one track, longitudinal aperture 51b for two tracks and 51c for three tracks, as shown in FIG. 9. The aperture plate 51 is arranged so that the longitudinal direction of the apertures 51b and 51c equals to the radial direction of the disk substrate 4.

The beam modulator 31 receives recording data from the main controller 38 in synchronism with clock timing, and outputs modulation signal corresponding to the recording data to the blanking plate 13. The modulation signal outputted by the beam modulator 31 indicates the selection of one of the apertures 51a to 51c of the aperture plate 51 or no selection of the aperture. The blanking plate 13 deflects the electron beam ejected from the electron ejection unit 11 in response to the modulation signal.

Figure 10:
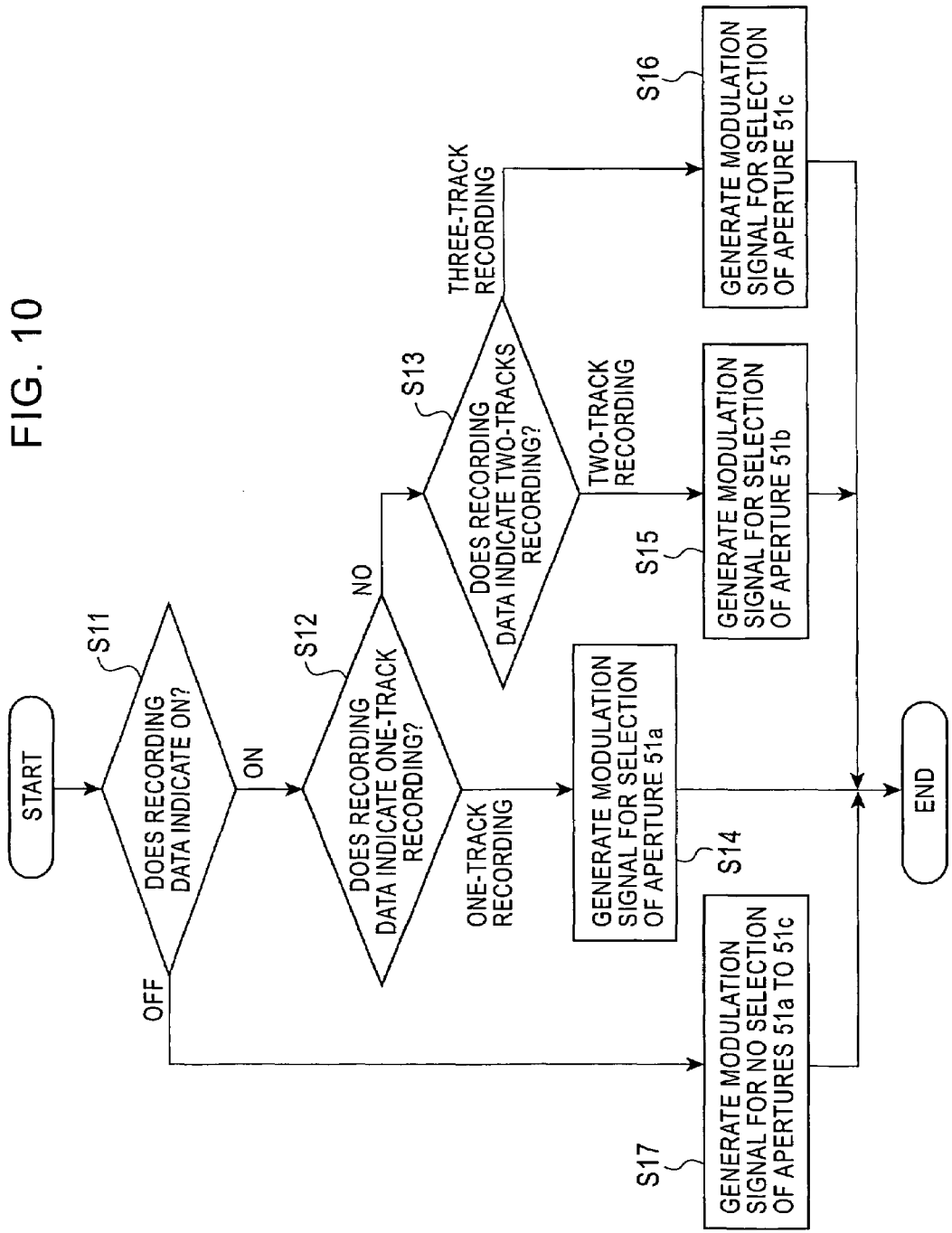
FIG. 10 is a flowchart showing the operation of the beam modulator used in the apparatus shown in FIG. 8.

When the recording data indicates on (recording) (step S11) and the judgment in step S12 indicates one-track recording as shown in FIG. 10, the beam modulator 31 supplies the blanking plate 13 with a modulation signal to select the aperture 51a (step S14). The blanking plate 13 deflects the electron beam ejected from the electron ejection unit 11 in response to this modulation signal. By the deflection, the electron beam passes through the aperture 51a of the aperture plate 51.

When the judgment in step S13 indicates two-track recording, the beam modulator 31 supplies the blanking plate 13 with a modulation signal to select the aperture 51b (step S15). The blanking plate 13 deflects the electron beam ejected from the electron emitter 11 in response to this modulation signal. By the deflection, the electron beam passes through the aperture 51b of the aperture plate 51.

When the judgment in step S13 indicates three-track recording, the beam modulator 31 supplies the blanking plate 13 with a modulation signal to select the aperture 51c (step S16). The blanking plate 13 deflects the electron beam ejected from the electron emitter 11 in response to this modulation signal. By the deflection, the electron beam passes through the aperture 51c of the aperture plate 51.

When the recording data indicates off (non-recording) (step S11), the beam modulator 31 supplies the blanking plate 13 with a modulation signal to select none of the apertures 51a to 51c (step S17). Corresponding to this modulation signal, the blanking plate 13 deflects the electron beam ejected from the electron emitter 11. By the deflection, the electron beam is blocked by the aperture plate 51.

The electron beam, after passing one of the apertures 51a to 51c, advances to the deflection coil 15, the alignment coil 16, the focus lens 18 and the object lens 19 to be finally irradiated onto the recording plane of the disk substrate 4 in the form of a spot. By electron beam irradiation on the disk substrate 4, the resist layer at the irradiated area is removed. The area where the resist layer has been removed forms a recessed portion, thus giving a pattern. On the other hand, in the case where the electron beam does not pass any of the apertures 51a to 51c, the electron beam cannot advance any more after the aperture plate 51, so that the beam is not irradiated onto the disk substrate 4.

As a result, as described above, patterns comprising the servo zone and data zone as shown in FIG. 4 are formed on the disk substrate 4.

Figure 11:
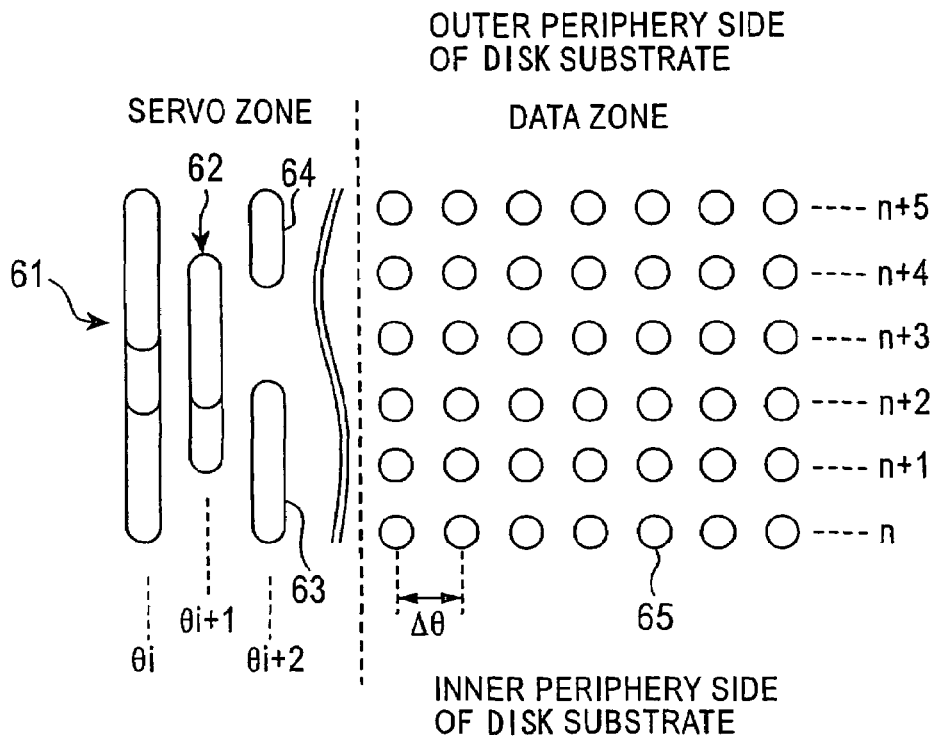
FIG. 11 is a diagram showing the method of forming the patterns for the servo zone and data zone shown in FIG. 4 when the apparatus shown in FIG. 8 is used.

The longitudinal mark in the servo zone is formed sequentially from the inner periphery side of the disk substrate 4, as shown, for example, in FIG. 11. In FIG. 11 similarly to the foregoing FIG. 5, six tracks n to n+5 are shown. A longitudinal mark 61 with a length spreading over six tracks is formed as follows; first of all, an electron beam passing through the aperture 51c is irradiated over the three-track length in the disk radial direction at the position of the rotation angle θi for the track n, then, an electron beam passing the aperture 51b is irradiated over the two-track length in the disk radial direction at the position of the rotation angle θi for the track n+2, and further an electron beam passing the aperture 51c is irradiated over the three-track length in the disk radial direction at the position of the rotation angle θi for the track n+3, so that these irradiated areas are continuously connected at the overlapping areas. A longitudinal mark 62 with a length spreading over four tracks is formed as follows; first of all, an electron beam passing through the aperture 51b is irradiated over the two-track length in the disk radial direction at the position of the rotation angle θi+1 for the track n+1, and then, an electron beam passing the aperture 51c is irradiated over the three-track length in the disk radial direction at the position of the rotation angle θi+1 for the track n+2, so that these irradiated areas are continuously connected at the overlapping areas. A longitudinal mark 63 with a length spreading over three tracks is formed by irradiating an electron beam passing the aperture 51c over the three-track length in the disk radial direction at the position of the rotation angle θi+2 for the track n. A longitudinal mark 64 with a length spreading over two tracks is formed by irradiating an electron beam passing the aperture 51c over the two-track length in the disk radial direction at the position of the rotation angle θi+2 for the track n+4.

Circular marks 65 in the data zone are formed by irradiating the electron beam passing the aperture 51a in the track order of the tracks n to n+5 with an interval of a predetermined unit angle Δθ as shown in FIG. 11.

Figure 12:
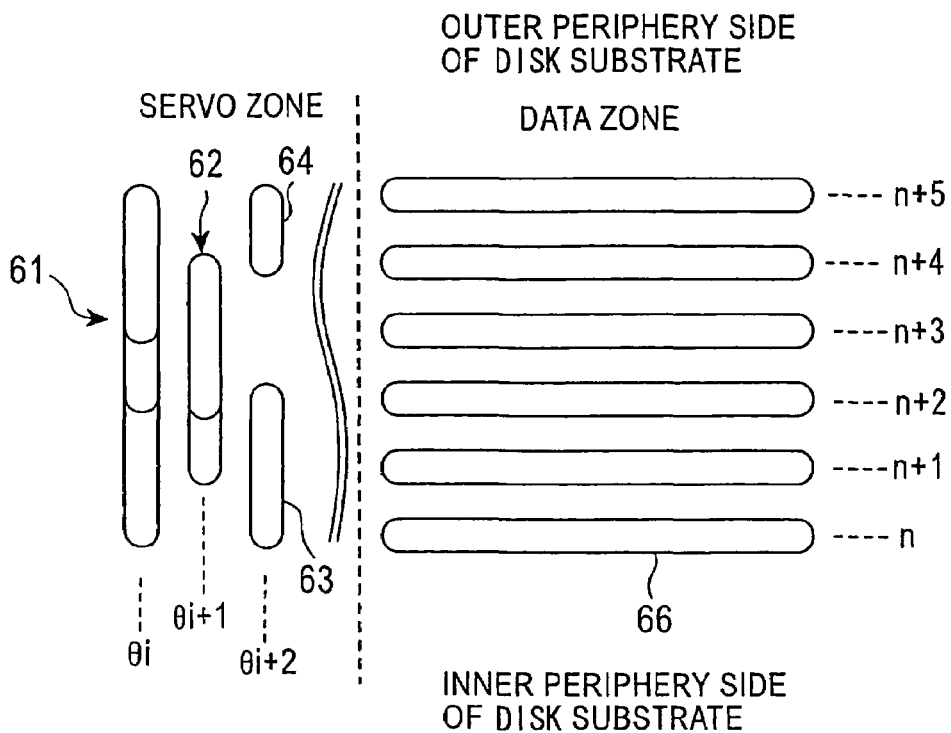
FIG. 12 is a diagram showing the method of forming the patterns for the servo zone and data zone shown in FIG. 6 when the apparatus shown in FIG. 8 is used.

FIG. 12 shows the method of forming each mark in the case where the patterns consisting of the servo zone and data zone such as shown in FIG. 6 are formed, wherein the servo zone is similar to that in FIG. 11. Continuous marks 66 in the data zone can be formed by continuously irradiating an electron beam passing through the aperture 51a in the track order of the tracks n to n+5.

Meanwhile, in the foregoing example, the aperture plate 51 is provided with the three apertures 51a to 51c, but may be provided with at least the apertures for one track and two tracks.

Figure 13:
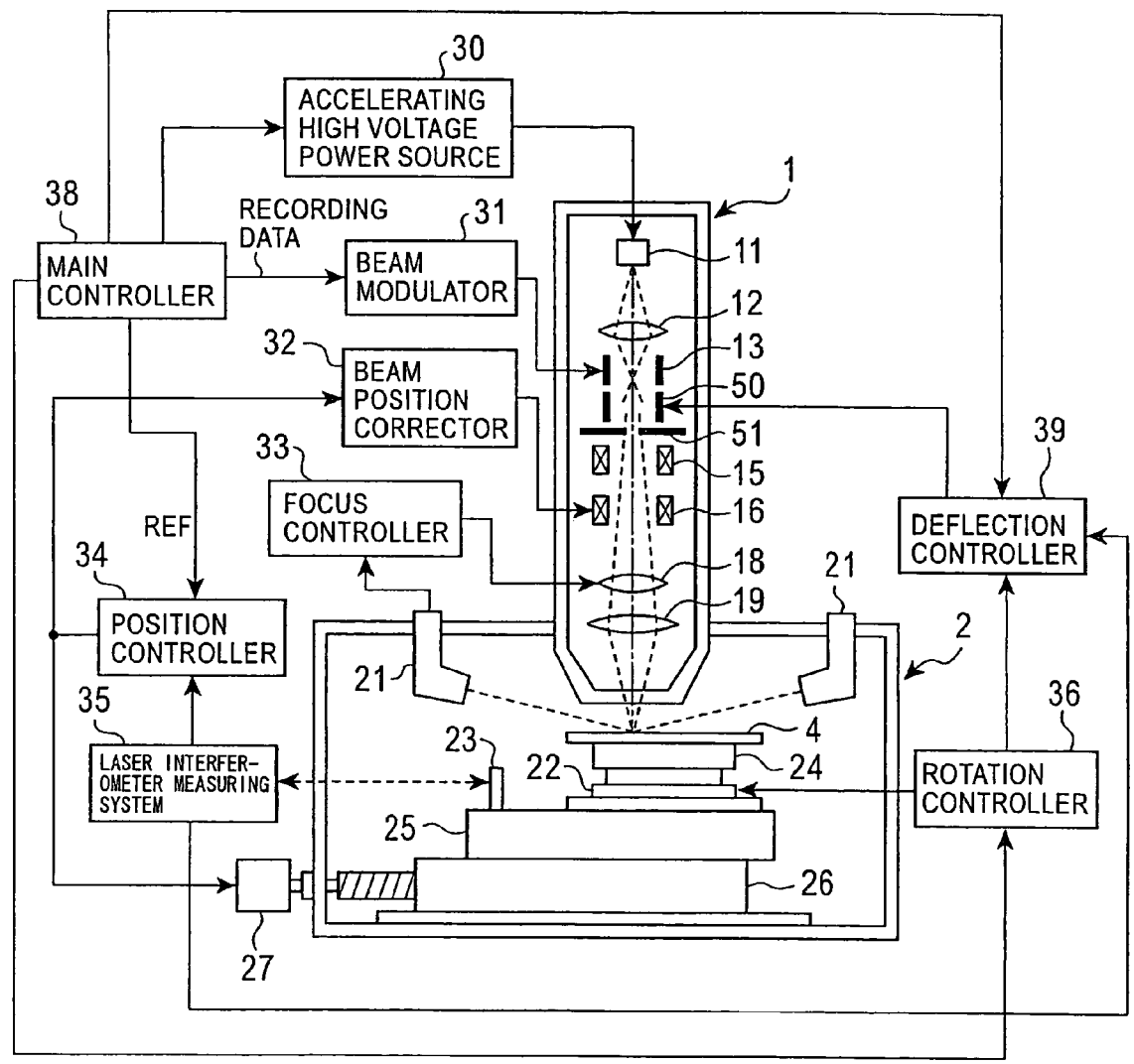
FIG. 13 is a diagram showing an electron beam recording apparatus according to the present invention.

FIG. 13 further shows another example of the present invention. In the electron beam recording apparatus shown in FIG. 13, the same parts as those shown in FIG. 8 are given the same signs.

Between the blanking plate 13 and the deflection coil 15 installed in the electron column 1, a high-speed deflector 50 and the aperture plate 51 are sequentially arranged. The high-speed deflector 50 deflects an electron beam in response to the output signal of a deflection controller 39. The aperture plate 51 is the same one as those shown in FIGS. 8 and 9.

The beam modulator 31 receives recording data in synchronism with clock timing from the main controller 38 and outputs beam modulation signal to the blanking plate 13 in response to the recording data. When the recording data indicates on (recording), the blanking plate 13 allows the electron beam to advance to the high-speed deflector 50 without deflection in response to the modulation signal. On the other hand, when the recording data indicates off (non-recording), the blanking plate 13 deflects the electron beam in response to the modulation signal.

The deflection controller 39 supplies the high-speed deflector 50 with deflection signal in response to the recording data fed by the main controller 38. This deflection signal represents selecting one of the apertures 51a to 51c of the aperture plate 51.

Figure 14:
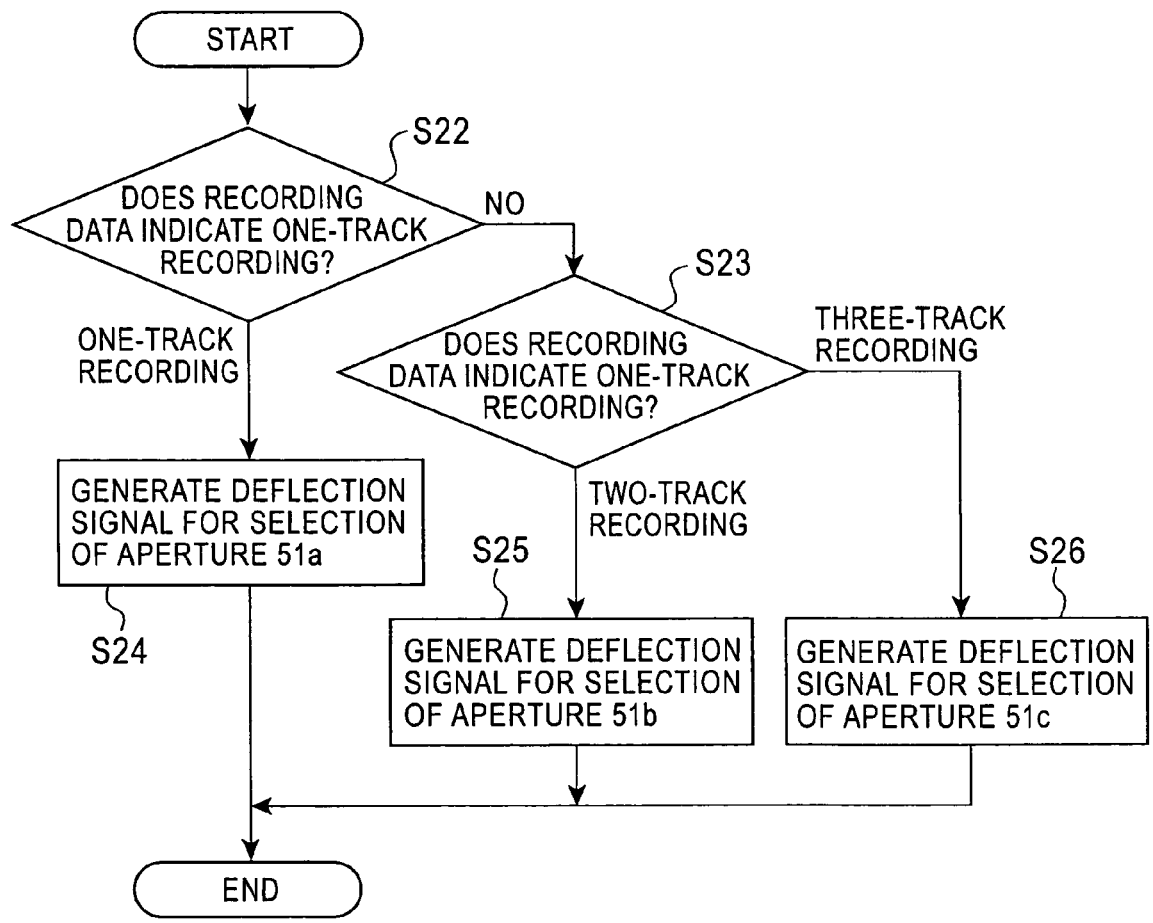
FIG. 14 is a flowchart showing the operation of the deflection controller used in the apparatus shown in FIG. 13.

When the recording data represents one-track recording (step S22), the deflection controller 39 supplies the high-speed deflector 50 with a deflection signal to select the aperture 51a (step S24) as shown in FIG. 14. The high-speed deflector 50 deflects the electron beam ejected from the electron emitter 11 in response to this deflection signal, so that the electron beam passes through the aperture 51a of the aperture plate 51.

When the recording data represents two-track recording (step S23), the deflection controller 39 supplies the high-speed deflector 50 with a deflection signal to select the aperture 51b (step S25). The high-speed deflector 50 deflects the electron beam ejected from the electron emitter 11 in response to this deflection signal, so that the electron beam passes through the aperture 51b of the aperture plate 51.

When the recording data represents three-track recording (step S23), the deflection controller 39 supplies the high-speed deflector 50 with a deflection signal to select the aperture 51c (step S26). The high-speed deflector 50 deflects the electron beam ejected from the electron emitter 11 in response to this deflection signal, so that the electron beam passes through the aperture 51c of the aperture plate 51.

Since the patterns formed on the disk substrate 4 by irradiation of the electron beam passing one of the apertures 51a to 51c on the disk substrate 4 are similar to those obtained by the electron beam recording apparatus of FIG. 8, their explanation is omitted here.

Figure 15:
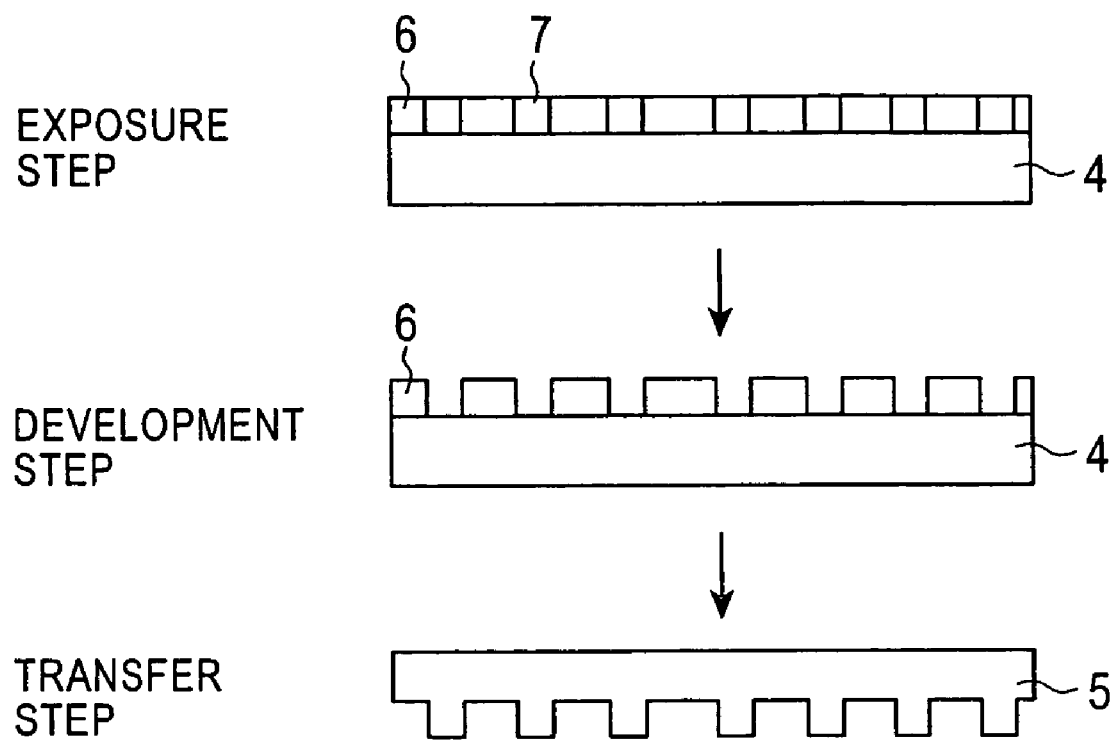
FIG. 15 is a diagram showing a process of manufacturing a stamper.

As shown in FIG. 15, a pattern containing the mark areas (the areas exposed to an electron beam) for each of the servo zone and the data zone formed by the electron beam irradiation on the disk substrate 4 in each of the examples described above is formed as a latent image 7 in a resist layer 6 of the disk substrate 4 (exposure step). After the disk substrate 4 thus treated is taken out of the electron beam recording apparatus, development treatment is carried out for the disk substrate 4 (development step). As a result, the mark areas exposed to the electron beam dissolve to form concavo-convex patterns in the servo zone and the data zone on the disk substrate 4. Via a transfer step a stamper 5 is made by transferring from the disk substrate 4 in which the concavo-convex patterns are formed.

In each of the embodiments described heretofore, electron beam recording apparatuses based on an X-θ or θ-X stage are used, but with use of an electron beam recording apparatus of X-Y type, pattern formation in the disk substrate can be carried out in a similar manner.

Next, the method of producing a magnetic disk based on the stamper 5 is described.

First of all, as shown in FIG. 16, a transfer layer 72 such as a resist layer is formed on the surface of a substrate material 71. The substrate material 71 is placed and fixed relative to the stamper 5 (substrate setting). The substrate material 71 is made of a non-magnetic material such as glass. Transfer is carried out by applying pressure to the transfer layer 72 by means of the stamper 5 (transfer step). Nano-in-printing method is applied for the transfer. For the substrate material 71 after the transfer step, etching is conducted (etching step). The transfer layer 72 remaining after the etching step is exfoliated off (exfoliation step). Through these steps, a substrate 73 having a surface on which the servo zones and the data zones are formed as concavo-convex patterns is made.

Then, a magnetic material film 74 is formed on the concavo-convex plane of the substrate 73 (step for magnetic material formation). The magnetic material film 74 is subjected to polishing treatment to leave the magnetic material film 74 only at the concaved areas in the surface of the substrate 73 (polishing step). Namely, each pattern in the servo zones and the data zones is formed with the magnetic material. Then, a lubricating layer 75 is formed on the surface of the substrate 73 (step for lubricating layer formation), resulting in a magnetic disk.

As has been described heretofore, according to the present invention, since the electron beam recording apparatus is provided with control means for forming a latent image in a resist layer corresponding to a predetermined pattern by controlling the irradiation position caused by the electron beam irradiation unit on the surface of the resist layer in accordance with the rotation angle of the disk substrate caused by a rotational drive unit, the shift distance caused by a shift drive unit and the recording data that represents the predetermined pattern, and beam-adjusting means that can irradiate an electron beam in such a manner as to spread over a plurality of tracks in the direction of traversing the tracks in response to the irradiation position control caused by the control means, a servo pattern can be formed on a disk substrate with a high accuracy. Further, the present invention has the advantage that magnetic transfer process using a servo track writer for a magnetic disk is unnecessary, because a servo pattern can be formed on a disk substrate in advance.

The invention claimed is:

1. An apparatus comprising:
a rotational drive unit for rotationally driving a disk substrate having a resist layer;
an electron beam irradiation unit;
a shift drive unit for shifting the irradiation position of the electron beam in a radial direction of said disk substrate;
a first control unit for acquiring a rotational angle of said disk substrate from said rotational drive unit;
a second control unit for acquiring a shift position from said shift drive unit; and
a third control unit for forming a latent image corresponding to a predetermined pattern in said resist layer by controlling the irradiation position caused by said electron beam irradiation unit on said resist layer in accordance with said rotational angle of said disk substrate, said shift position and said predetermined pattern;
wherein said electron beam irradiation unit includes a beam-adjusting system for adjusting the irradiation of said electron beam in such a manner as to spread over a plurality of tracks in the direction of traversing the tracks on said resist layer in response to the irradiation position control by said third control unit.

2. The electron beam recording apparatus according to claim 1, wherein said beam-adjusting system is a high-speed deflector for deflecting said electron beam at a high speed in the radial direction of said disk substrate.

3. The electron beam recording apparatus according to claim 1, wherein said beam adjusting system includes an aperture plate provided with a one-track aperture and a plural-track aperture which is expanded by at least a two-track length in the radial direction of said disk substrate and a deflecting system for deflecting said electron beam so as to selectively pass through an aperture plate.

4. The electron beam recording apparatus according to claim 3, wherein said deflecting system is a blanking plate.

5. The electron beam recording apparatus according to claim 3, wherein said deflecting system is a high-speed deflector arranged between a blanking plate and said aperture plate.

6. The electron beam recording apparatus according to claim 1, wherein when the irradiation position of said electron beam is at a first predetermined track and the rotation angle of said disk substrate is at a predetermined rotation angle, said beam-adjusting system continuously irradiates the electron beam over said first predetermined plural number of tracks in the radial direction of said disk substrate towards the outer periphery side of said disk substrate from said first predetermined track, and thereafter, when the irradiation position of the electron beam is at a second predetermined track that is apart from said first predetermined track by at least said first predetermined plural number of tracks towards the outer periphery side of said disk substrate and the rotation angle of said disk substrate is at said predetermined rotation angle, said beam-adjusting means continuously irradiates the electron beam over said second predetermined plural number of tracks in the radial direction of said disk substrate towards the outer periphery side of said disk substrate from said second predetermined track, so that a longitudinal continuous pattern longer than the track-to-track distance for said first predetermined plural number of tracks is formed as a latent image at said predetermined rotation angle of said disk substrate.

7. The electron beam recording apparatus according to claim 1, wherein said predetermined pattern is a pattern in which a servo zone and a data zone are repeated for each predetermined angle, and said servo zone includes patterns extending over said plurality of tracks.

8. The electron beam recording apparatus according to claim 7, wherein said servo zone includes a mark part which contains at least one of a clock signal, an address signal for representing address information on a track and a position detecting signal.

9. The electron beam recording apparatus according to claim 8, wherein said clock signal is formed in a servo clock area, said address signal is formed in an address mark area, and said position detecting signal is formed in a position detection mark area, respectively.

10. An electron beam recording method comprising steps of:
rotating a disk substrate on which a resist layer is formed;
irradiating an electron beam onto the surface of said resist layer;
shifting the irradiation position of said electron beam in a radial direction of said disk substrate;
acquiring a rotational angle of said disk substrate;
acquiring a shift position of said disk substrate; and
forming a latent image corresponding to a predetermined pattern in said resist layer by controlling the irradiation in said irradiating step on said resist layer in accordance with said rotational angle of said disk substrate, said shift position and said predetermined pattern;
wherein said irradiating step irradiates said electron beam in such a manner as to spread over a plurality of tracks in the direction of traversing the tracks on said resist layer in response to the irradiation position control in said forming step.

11. An apparatus for controlling an electron beam system comprising:
a first control unit for acquiring a rotational angle of a rotating disk substrate;
a second control unit for acquiring a shift position of said rotating disk substrate; and
a third control unit for forming a latent image corresponding to a predetermined pattern in said disk substrate by controlling an irradiation position caused by an electron beam on said disk substrate in accordance with said rotational angle of said disk substrate, said shift position and said predetermined pattern, wherein said third control unit adjusts irradiation of said electron beam to spread over a plurality of tracks in the direction of traversing the tracks on said disk substrate.

12. A method for controlling an electron beam system comprising the steps of:
acquiring a rotational angle of a rotating disk substrate;
acquiring a shift position of said rotating disk substrate; and
forming a latent image corresponding to a predetermined pattern in said disk substrate by controlling an irradiation position caused by an electron beam on said disk substrate in accordance with said rotational angle of said disk substrate, said shift position and said predetermined pattern, wherein said forming step further comprises adjusting irradiation of said electron beam to spread over a plurality of tracks in the direction of traversing the tracks on said disk substrate.

* * * * *